US009880004B2

(12) United States Patent
Castellucci et al.

(10) Patent No.: US 9,880,004 B2
(45) Date of Patent: Jan. 30, 2018

(54) GEOGRAPHICAL CONSTRAINTS-AWARE MAP ROUTING

(71) Applicant: International Business Machines Corporation, Armonk, NY (US)

(72) Inventors: Antonio Castellucci, Rome (IT); Roberto Guarda, Pomezia (IT); Michele Iovino, San Leucio del Sannio (IT); Gianluca Pulcini, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 14/854,179

(22) Filed: Sep. 15, 2015

(65) Prior Publication Data

US 2017/0074662 A1    Mar. 16, 2017

(51) Int. Cl.
| | | |
|---|---|---|
| *G01C 21/00* | (2006.01) | |
| *G01C 21/20* | (2006.01) | |
| *G01C 21/34* | (2006.01) | |
| *G01C 21/36* | (2006.01) | |

(52) U.S. Cl.
CPC ......... *G01C 21/20* (2013.01); *G01C 21/3446* (2013.01); *G01C 21/00* (2013.01); *G01C 21/3667* (2013.01)

(58) Field of Classification Search
None
See application file for complete search history.

(56) References Cited

U.S. PATENT DOCUMENTS

| | | | | |
|---|---|---|---|---|
| 6,101,443 A | * | 8/2000 | Kato ................. | G01C 21/3415 340/995.21 |
| 6,691,027 B1 | * | 2/2004 | Tu ....................... | G01C 21/343 701/533 |
| 8,467,958 B2 | * | 6/2013 | Schwarzmann ...... | G01C 21/00 342/451 |
| 2001/0040984 A1 | * | 11/2001 | Kambe ................. | G01C 21/20 382/113 |
| 2009/0216438 A1 | * | 8/2009 | Shafer .................. | G01C 21/20 701/414 |
| 2011/0313592 A1 | * | 12/2011 | Matsumura ........... | G01C 21/26 701/1 |
| 2016/0334236 A1 | * | 11/2016 | Mason ................. | G01C 21/3492 |

* cited by examiner

*Primary Examiner* — Thomas G Black
*Assistant Examiner* — Demetra Smith-Stewart
(74) *Attorney, Agent, or Firm* — Garg Law Firm, PLLC; Rakesh Garg; William Hartwell

(57) ABSTRACT

A not crossable element (NCE) is marked using a shape on a map. A map data does not prevent a route from crossing the NCE. A closed area is selected on the map, which includes a polygon bound on one side by a portion of the shape. A set of mapping points (MP) that are included in the closed area is selected. A route is formed by connecting one MP to another MP. A subset of MPs is identified as a set of candidate MPs (CMP). Each CMP lies within a search distance of a not-mapping point (NMP). The CMPs are sorted according to CMP-NMP distances. A subset of CMPs is selected whose paths to the NMP do not intersect with any shape corresponding to any NCE in the closed area. The NMP is linked in the route with a selected CMP from the subset of CMPs.

19 Claims, 19 Drawing Sheets

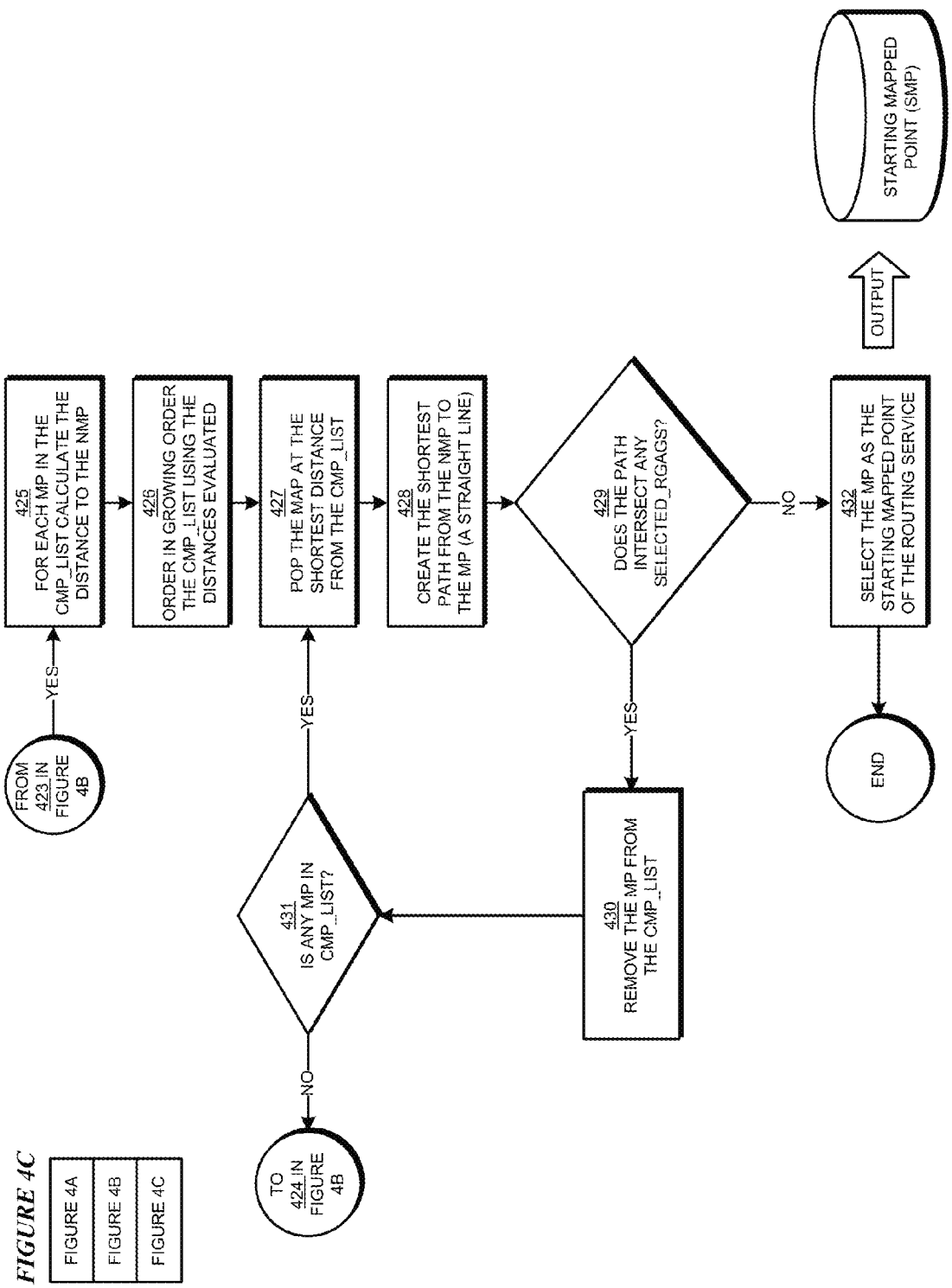

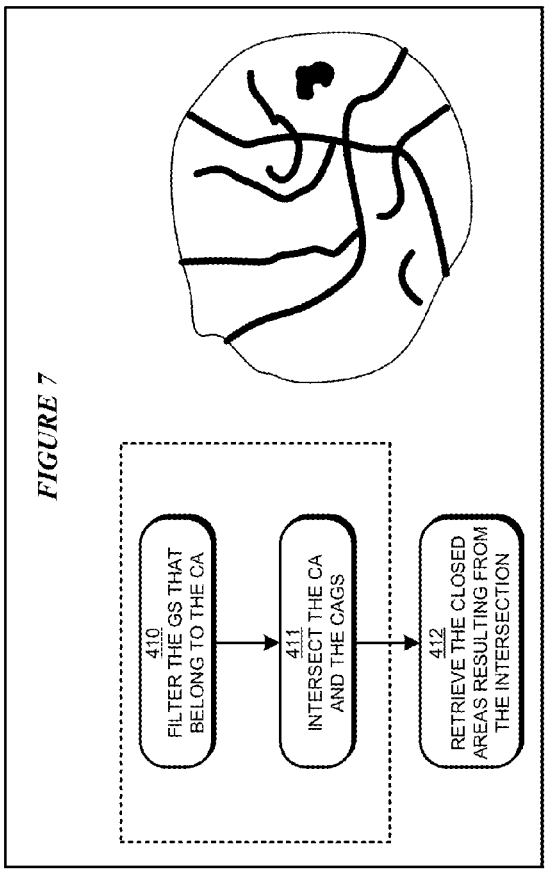
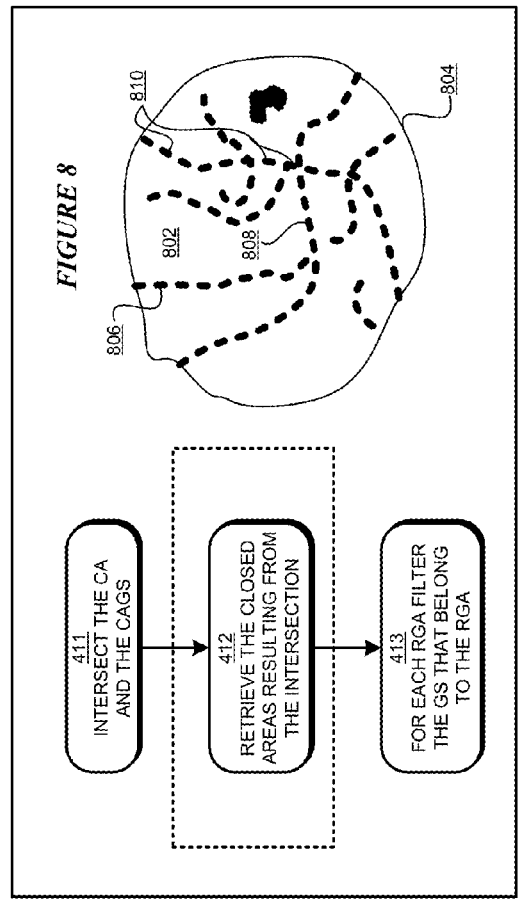

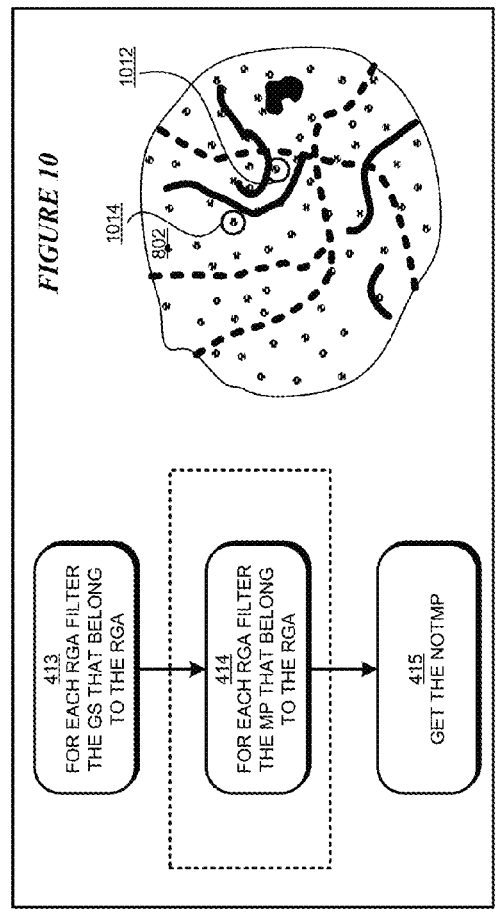
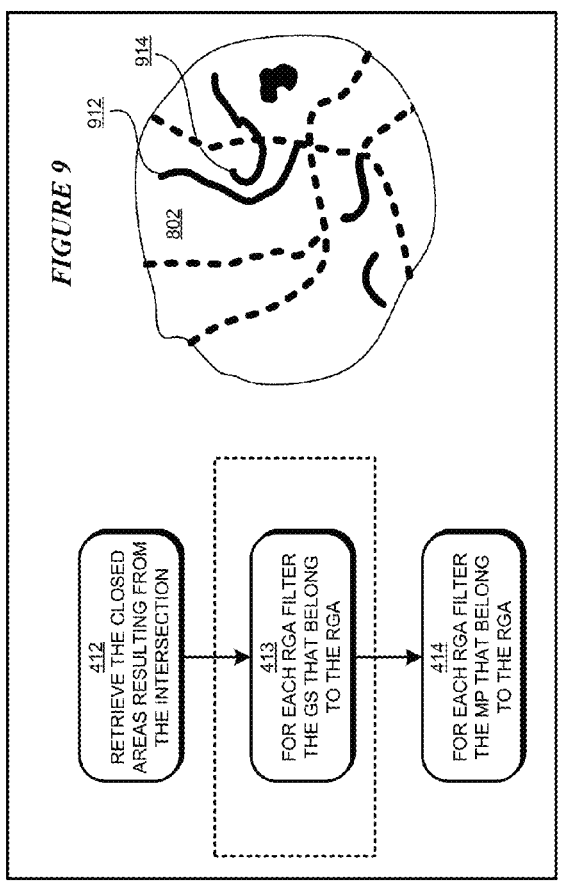

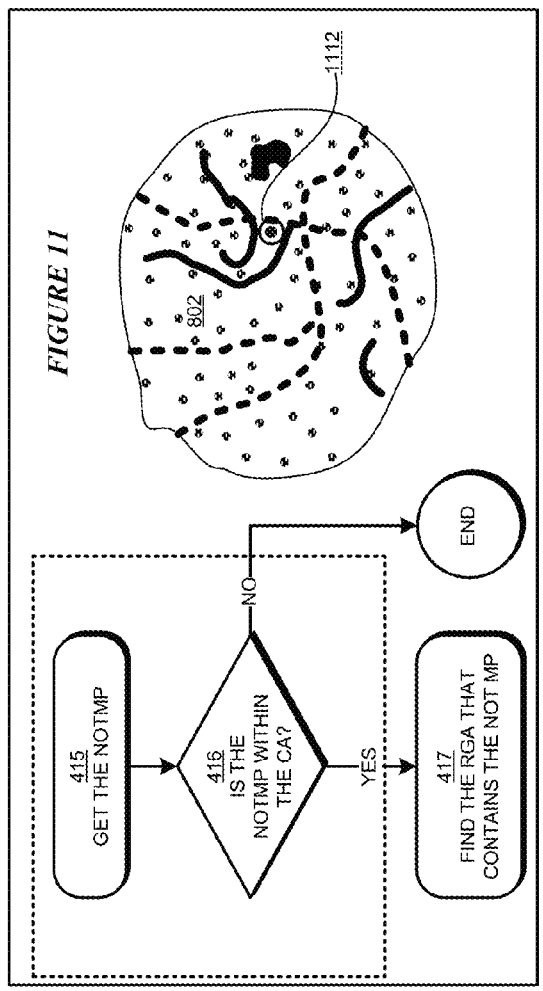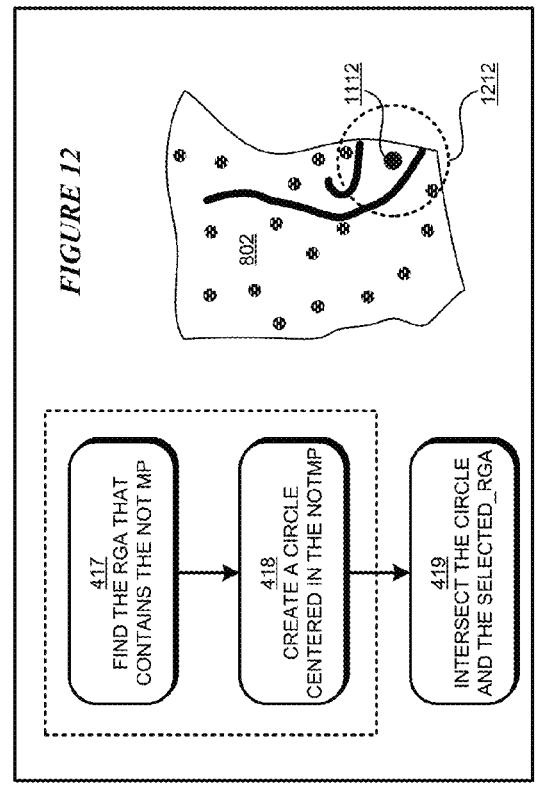

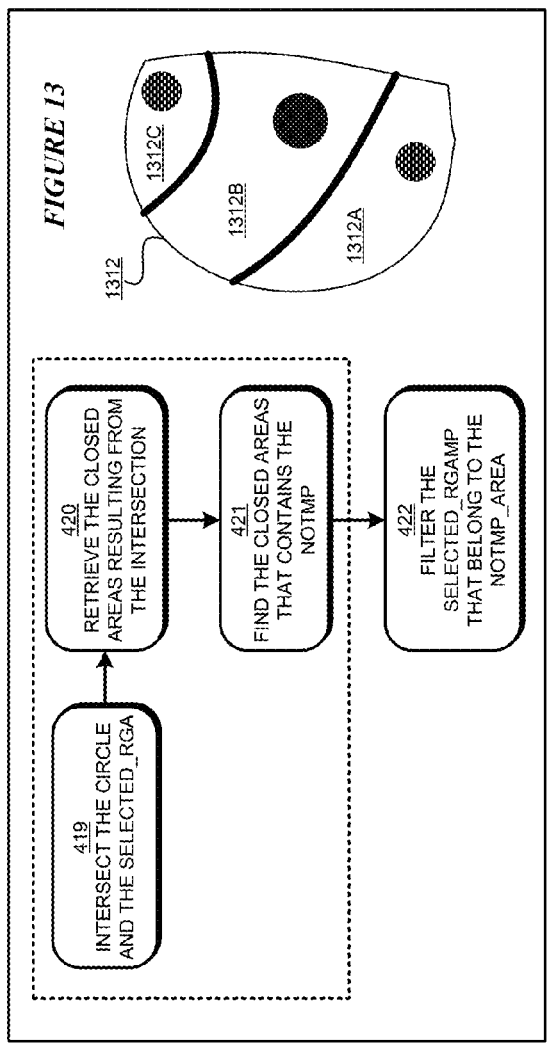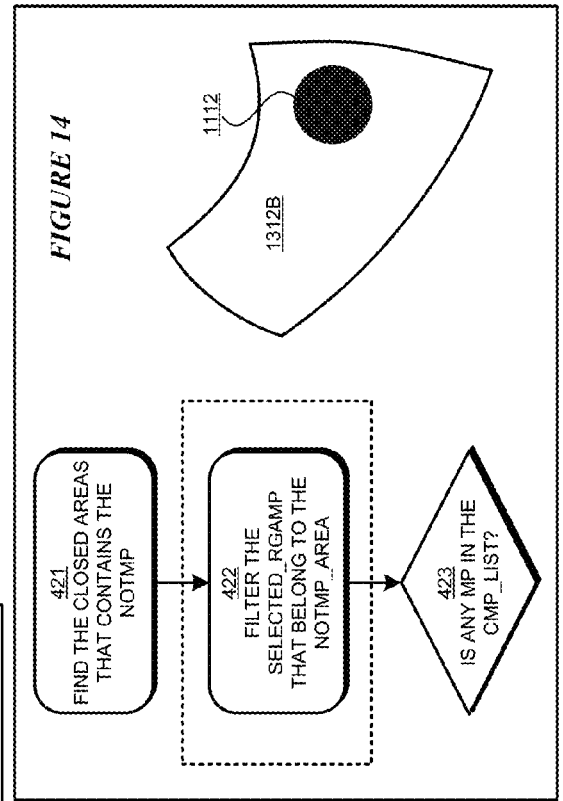

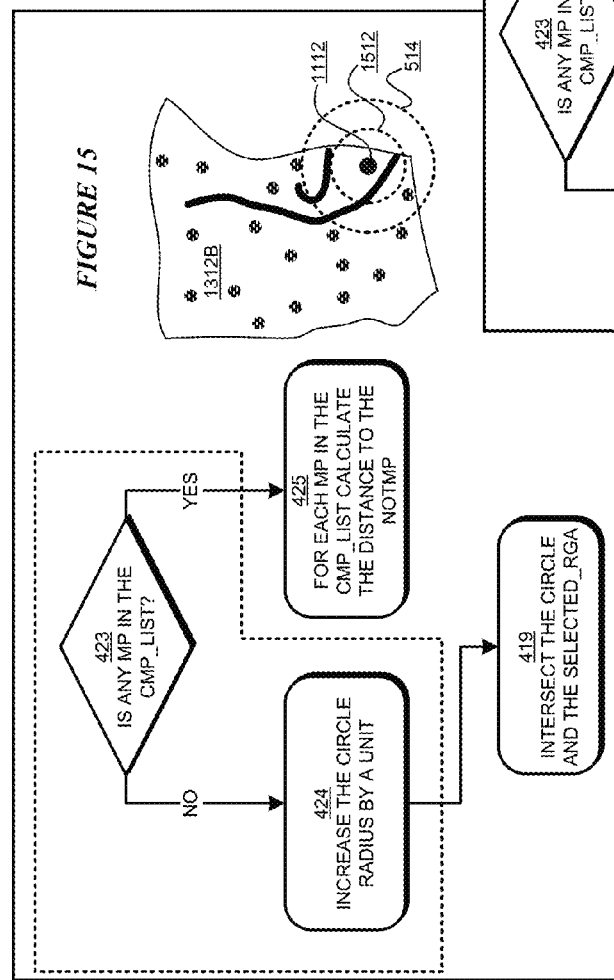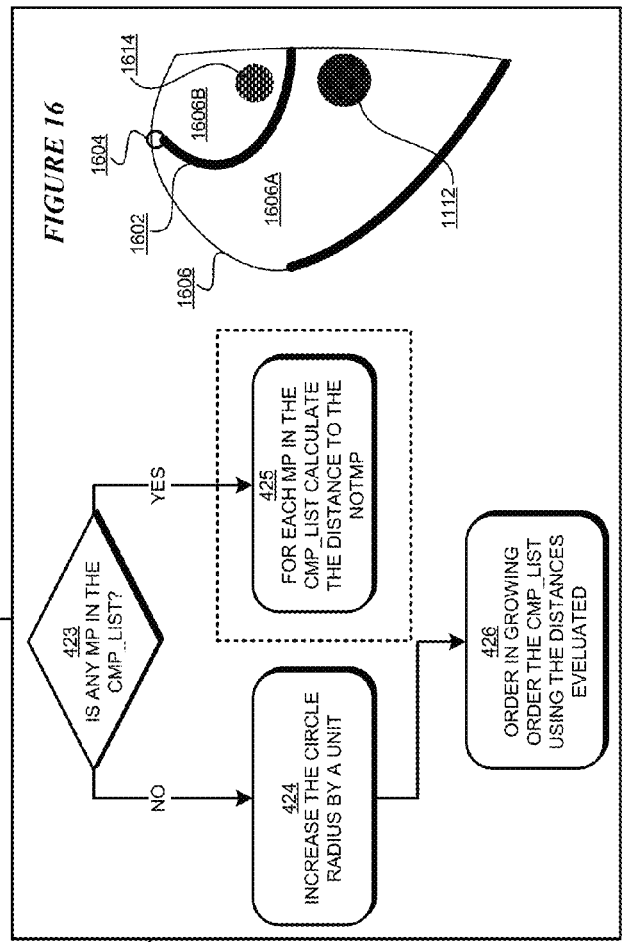
FIGURE 15
FIGURE 16

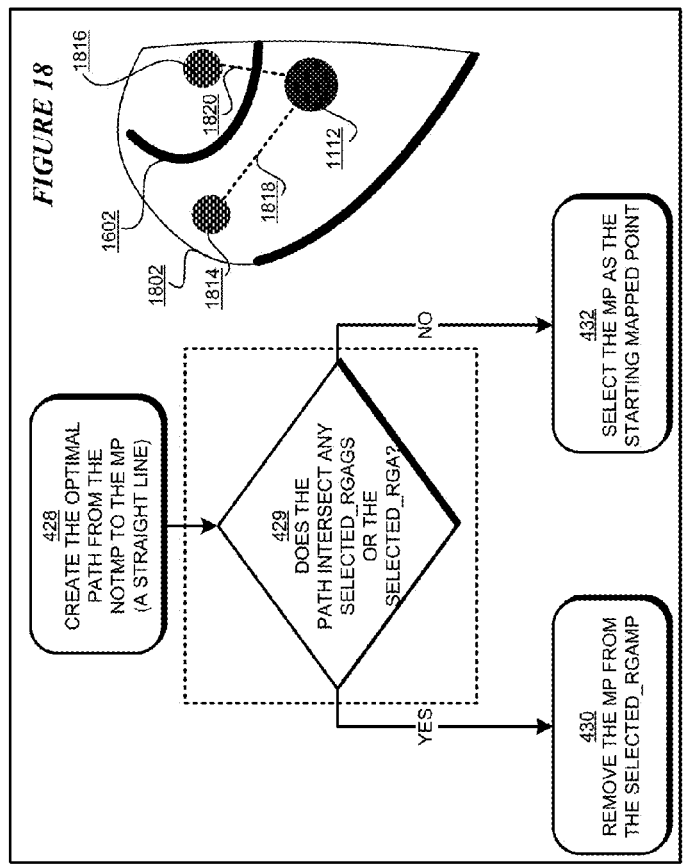
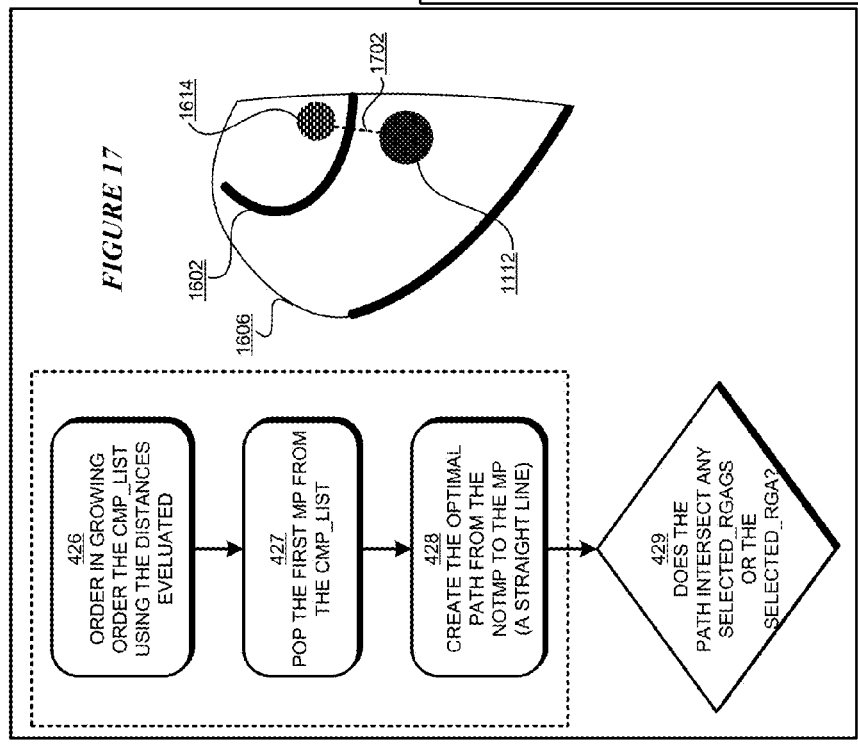

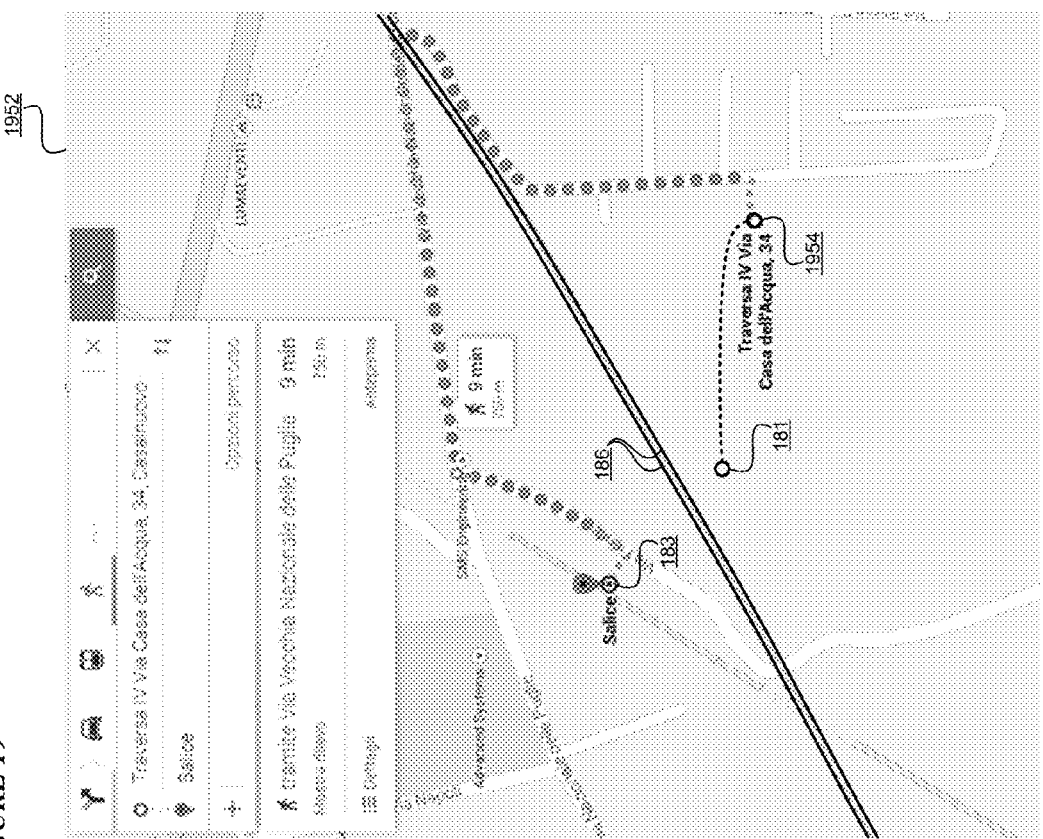
FIGURE 19

US 9,880,004 B2

GEOGRAPHICAL CONSTRAINTS-AWARE MAP ROUTING

TECHNICAL FIELD

The present invention relates generally to a method, system, and computer program product for computing a route in a map application. More particularly, the present invention relates to a method, system, and computer program product for geographical constraints-aware map routing.

BACKGROUND

A variety of tools and technologies are presently available for navigating in geographical spaces. Global Positioning System (GPS) is a well known technology that finds prevalent use in navigating in geographical spaces. Cellular triangulation is another technology that is used either as an assistive method to GPS navigation or as a stand-alone method for navigation.

Navigating in geographical spaces essentially uses two things—a map of the geographical space, and a location of the navigation device in that map. Generally, a map database provides the map data for the first part, and GPS or other technology provides the navigating device's location relative to that map data.

Geographical spaces include boundaries. These boundaries are defined in a variety of ways. For example, countries have boundaries or borders relative to other countries. Similarly, states or provinces within a country have boundaries with other states or provinces. Likewise, cities, town, and suburbs have boundaries. Airspace boundaries exist in the air and maritime boundaries exist in navigable waters.

Furthermore, the boundaries can be interpreted in other ways as well. For example, the premises of a sporting arena have a boundary, a perimeter of a building is a boundary, and an area within a building also has boundary.

Some boundaries are visible to humans, and other boundaries are not. For example, a boundary on land between countries can be visibly marked with physical markers, or can be unmarked and therefore invisible. A boundary in a water body is often not marked with visible markers. Vast land areas including several real properties may not have visible markings demarcating one property from another.

Map data presently represents some such boundaries, including some visible boundaries and some invisible boundaries from a given geographical space. For example, maps show continuous boundaries between countries, over land, in water, and in the air, regardless of whether corresponding boundaries are physically marked in the corresponding geographical space.

While three dimensional (3D) maps and routes can be formed to represent a 3D geographical space, the illustrative embodiments are described using the most commonly used two dimensional (2D) maps of 3D geographical spaces. Such 2D maps represent 3D objects as 2D outlines. For example, 3D spaces are represented as 2D areas, and 3D structures, such as towers or hills, are represented as points, lines, or areas in the 2D map.

A common use of presently available map data is in computing a travel route from point A to point B in the geographical space. Presently, a map application identifies points A and B on a map and computes a route to navigate from A to B on that map using the routing elements defined in the map data. For example, a road is a routing element and is often represented as a line on a map. A route computed by a presently used map application attempts to use routing elements such as known roads, paths, highways, streets, and intersections thereof, to connect point A to point B. The routing elements selected by the map application can be constrained based on the mode of transportation used, and other conditions such as traffic, toll, speed limits, and the like.

The illustrative embodiments recognize that this method of finding routes works so long as points A and B are on a routing element. Often, a routing solution is needed between points A and B where either point A (the start or the origination), or point B (the end or the destination), or both are not on a routing element, i.e., to overlapping with a routing element.

The illustrative embodiments recognize that such situations are very common in day to day navigation using a map application. For example, a user commonly asks for a routing from the user's current location to a destination. The user may not be on a routing element, e.g., a road, but out in a field that is at some distance from a routing element. In many cases, destination also may not be on a routing element but in another area of the map that is not occupied by a routing element, and at some distance from the nearest routing element.

Hereinafter, a point that lies on a routing element of a map is called a "mapped point" or "MP", and a point that lies in an area of the map that is not occupied by a routing element is called a "not mapped point", and is referred to herein interchangeably as "NMP" or "NOTMP" or "NOT MP". When either point A, or point B, or both are NMPs, different map applications handle the routing differently. For example, some presently used map applications will only route from an MP to another MP.

Some other routing applications do route from an NMP to an MP, or an NMP to an NMP, or an MP to an NMP. For example, such a routing solution draws a line between a starting NMP to the nearest beginning MP, generate the route from that beginning MP to another ending MP nearest to a destination NMP, and draw another line from the ending MP to the destination NMP.

FIGS. 1A, 1B, 1C, and 1D show some examples of the routes generated by prior art map applications. In FIG. 1A, NMP 151 is connected to MP 152, MP 152 is connected to MP 153, and MP 153 is connected to NMP 154. Route section 155 is a line of the shortest distance between NMP 151 and MP 152. Similarly, route section 156 is a line of the shortest distance between MP 153 and NMP 154.

In FIG. 1B, NMP 161 is connected to MP 162, MP 162 is connected to NMP 163. Route section 164 is a line of the shortest distance between NMP 161 and MP 162. Similarly, route section 165 is a line of the shortest distance between MP 162 and NMP 163.

In FIG. 1C, NMP 171 is connected to MP 172, MP 172 is connected to MP 173, and MP 173 is connected to NMP 174. Route section 175 is a line of the shortest distance between NMP 171 and MP 172. Similarly, route section 176 is a line of the shortest distance between MP 173 and NMP 174.

In FIG. 1D, NMP 181 is connected to MP 182, MP 182 is connected to NMP 183. Route section 184 is a line of the shortest distance between NMP 181 and MP 182. Similarly, route section 185 is a line of the shortest distance between MP 182 and NMP 183.

The routings of FIGS. 1A-D have been actually produced from presently available map applications. The illustrative embodiments recognize that in producing routings of FIGS. 1A-D, the prior-art map applications have failed to account for geographical constraints present in the geographical space where the route has to be navigated. A geographical constraint is a feature on a map that cannot be crossed by the selected mode of transportation in an actual geographical space but is not marked in the map data to avoid routing through it. Hereinafter, such geographical constraint is called a "not crossable element" or "NCE". An NCE may correspond to an area, a line or a point on a 2D map that rendered from a given map data and is not precluded for routing or crossing in the map data.

For example, in FIG. 1B, route section 164 requires the navigation to occur across a water body, which is an example of an NCE. As another example, in FIG. 1C, route section 175 requires the navigation to occur across a highway, which is another example of an NCE. As another example, in FIG. 1D, route section 184 requires the navigation to occur across a railway track, which is another example of an NCE.

Thus, the illustrative embodiments recognize that the presently available map applications and other routing solutions fail to recognize these NCEs and other similar geographical constraints through which navigation should not occur for practical reasons. As a result, the routing produced from such map applications and other routing solutions are often impractical, dangerous, or simply not useful to a user given the geographical constraints the user is facing in the geographical space.

SUMMARY

The illustrative embodiments provide a method, system, and computer program product for geographical constraints-aware map routing. An embodiment includes a method for geographical constraints-aware map routing. The embodiment marks, using a shape on a map, a not crossable element (NCE), wherein a data of the map does not prevent a route from crossing the NCE. The embodiment selects a closed area on the map, wherein the closed area comprises a polygon bound at least on one side by a portion of the shape. The embodiment selects a set of mapping points (MP) that are included in the closed area, wherein a route is formed by connecting one MP to another MP. The embodiment identifies, using a processor and a memory, a subset of MPs as a set of candidate MPs (CMP), wherein each CMP lies within a search distance of a not-mapping point (NMP), and wherein the NMP has to be included in the route. The embodiment sorts the CMPs in the set of CMPs according to a distance of each CMP from the NMP. The embodiment selects, from the set of CMPs, a subset of CMPs whose paths to the NMP do not intersect with any shape corresponding to any NCE in the closed area. The embodiment links with the NMP, in the route, a selected CMP from the subset of CMPs. Thus, the method of an embodiment creates a safer and more practically usable route for a user on an electronic map as compared to a prior-art routing method.

Another embodiment includes a computer program product for geographical constraints-aware map routing, the computer program product comprising one or more computer-readable storage devices, and program instructions stored on at least one of the one or more storage devices. Thus, the computer program product of an embodiment creates a safer and more practically usable route for a user on an electronic map as compared to a prior-art routing computer program product.

Another embodiment includes a computer system for geographical constraints-aware map routing, the computer system comprising one or more processors, one or more computer-readable memories, and one or more computer-readable storage devices, and program instructions stored on at least one of the one or more storage devices for execution by at least one of the one or more processors via at least one of the one or more memories. Thus, the computer system of an embodiment creates a safer and more practically usable route for a user on an electronic map as compared to a prior-art routing computer system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4C depicts another portion of the process for geographical constraints-aware map routing in accordance with an illustrative embodiment;

FIG. 7 depicts the selected subset of GSs overlaid on the CA in accordance with an illustrative embodiment;

FIG. 8 depicts the closed areas or polygons formed in accordance with an illustrative embodiment;

FIG. 9 depicts the CAGSs applicable to several RGA in accordance with an illustrative embodiment;

FIG. 10 depicts the MPs applicable to several RGA in accordance with an illustrative embodiment;

FIG. 11 depicts an NMP that is received as the input in accordance with an illustrative embodiment;

FIG. 12 depicts an example circle centered at the NMP in an RGA in accordance with an illustrative embodiment;

FIG. 13 depicts an example closed area, which is a part of an RGA within a circle centered at the NMP in accordance with an illustrative embodiment;

FIG. 14 depicts an example scenario of the candidate MP list in accordance with an illustrative embodiment;

FIG. 15 depicts an example manner of changing a search distance for CMPs in accordance with an illustrative embodiment;

FIG. 16 depicts the distance based selection of CMP in accordance with an illustrative embodiment;

FIG. 17 depicts the path between the NMP and the CMP in accordance with an illustrative embodiment;

FIG. 18 depicts a successful search for a CMP in an enlarged search area in accordance with an illustrative embodiment; and FIG. 19 depicts comparative routes to compare a prior-art routing with the geographical constraints-aware map routing in accordance with an illustrative embodiment.

DETAILED DESCRIPTION

Figure 1A:
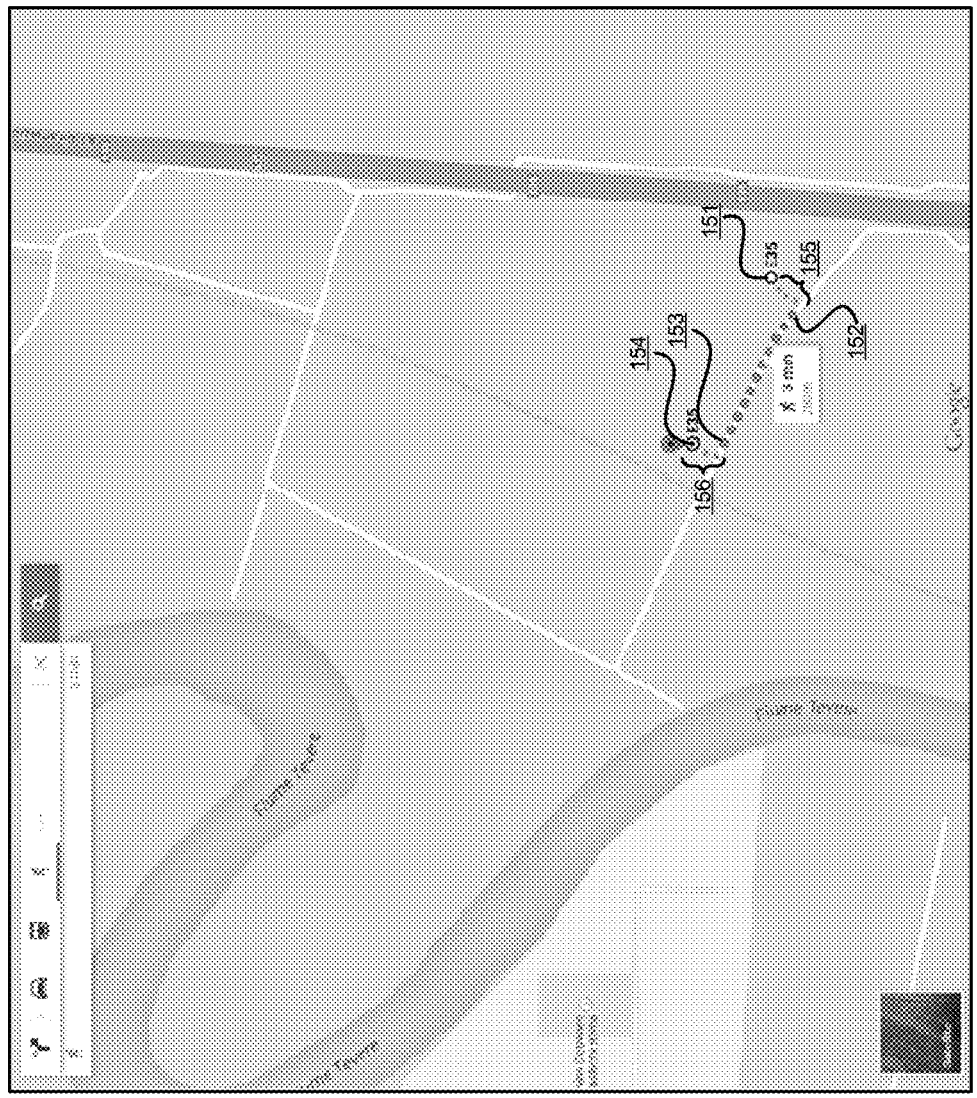
FIG. 1A depicts an example route generated by a prior art map application.
Figure 1B:
FIG. 1B depicts an example of an impractical route generated by a prior art map application.
Figure 1C:
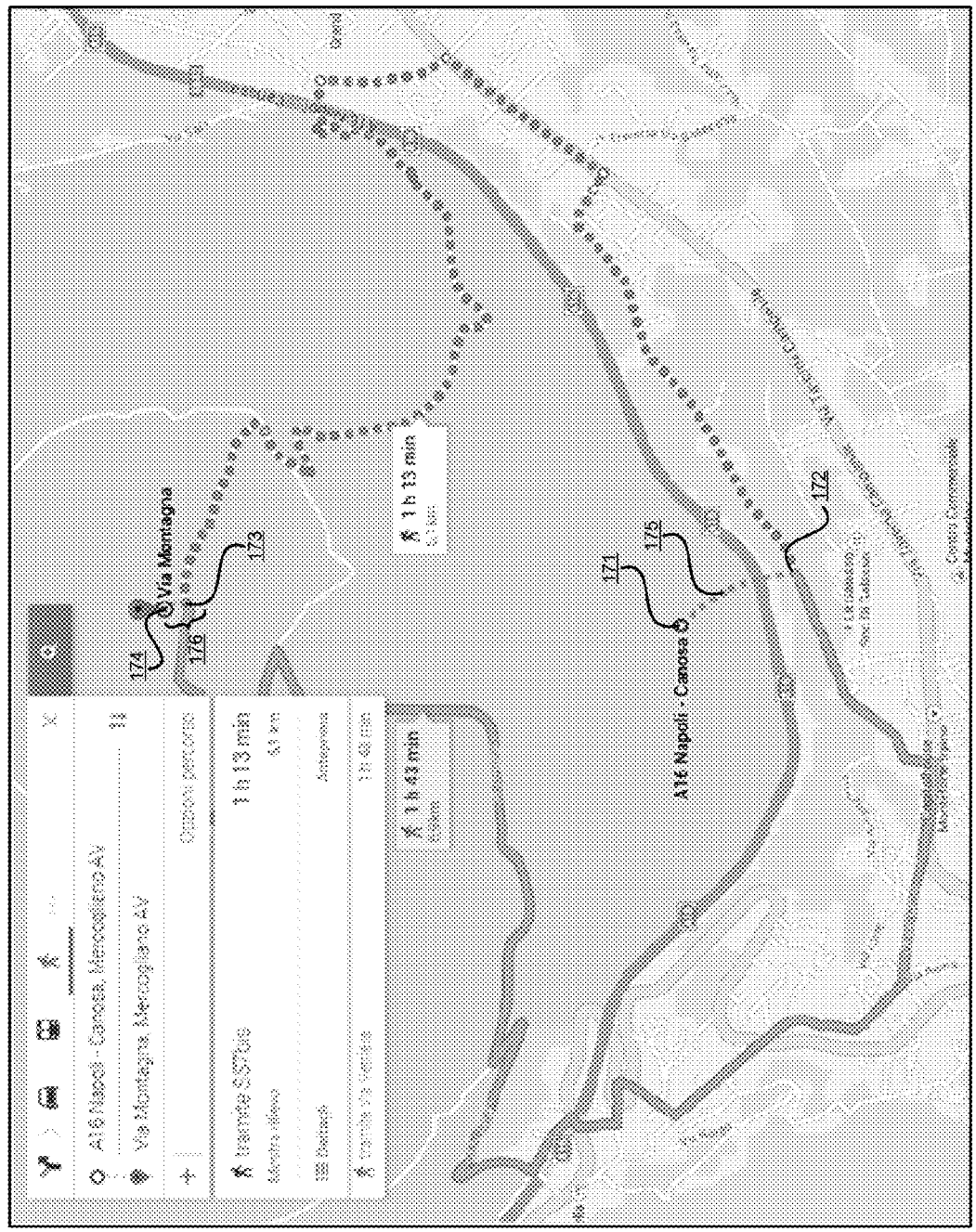
FIG. 1C depicts another example of an impractical route generated by a prior art map application.

The illustrative embodiments used to describe the invention generally address and solve the above-described problems and other problems related to routing using a map application. The illustrative embodiments provide a method, system, and computer program product for geographical constraints-aware map routing.

An embodiment identifies a feature on a given map that is an NCE. As one example, the embodiment selects an area of the map that is occupied by a water body such that the area that represents the water body is not marked in the map data to prevent routing through or crossing through. As another example, the embodiment selects an area of the map that is occupied by a railroad track such that the area that represents the track is not marked in the map data to prevent routing or crossing through. Generally, an embodiment can recognize any line or area depicted in a map or identified in a map data as an NCE in a similar manner.

An embodiment creates a geo shape (GS) to define a boundary around an NCE. For example, if a water body NCE is represented by an area of irregular closed shape, the embodiment defines a GS of the corresponding irregular closed shape or polygon around the water body NCE. As another example, if an NCE is represented by an area of irregular or geometric closed or open shape, the embodiment defines a polygon of that shape as a GS around the NCE area. For example, if an NCE is a railroad track represented by a line or a thin rectangular area that is closed on one end within the map and open on another end, or open on both ends in the map, the embodiment defines a rectangular GS of zero or some suitable width as a GS around the track NCE.

These examples of NCEs and GSs are not intended to be limiting. From this disclosure, those of ordinary skill in the art will be able to conceive many other NCEs and corresponding GSs and the same are contemplated within the scope of the illustrative embodiments. Generally, a GS can take the form of a line, polylines, polygons, multipolygons, continuous open or closed curves, or a combination thereof, within the scope of the illustrative embodiments.

Another embodiment further stores the GSs information about a given map. For example, one embodiment can pre-process the map data of one or more maps in a map repository to identify the NCEs therein, define the GSs to bound those NCEs, and store the GSs information in a repository. The repository may be, but need not be, the map data repository. Another example embodiment processes a map data of one or more maps when the map is selected for routing, and on-demand during the route computation identifies the NCEs therein, defines the GSs to bound those NCEs, and stores the GSs information in a repository. The stored GSs avoid the need to re-identify the NCE and recompute the corresponding GS during a future use.

When a route has to link an NMP on a map, another embodiment further uses the GS information about the given map to select an MP to which an NMP should be linked. For example, if the NMP is located in a polygon bound by one or more GSs, the embodiment selects for linking with the NMP that MP which also lies within the polygon.

As another example, if the NMP is in an area on one side of a polyline, where the polyline is formed or defined by one or more GSs, the embodiment selects for linking with the NMP that MP which also lies on the same side of the polyline as the NMP.

Figure 1D:
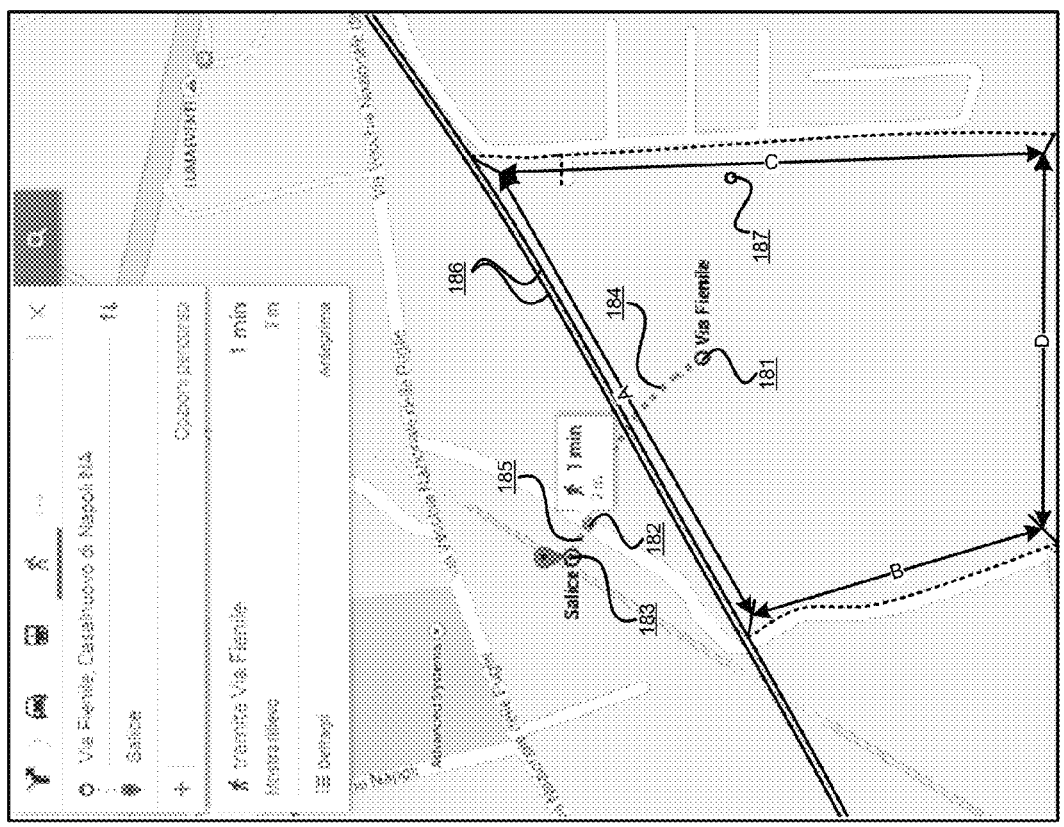
FIG. 1D depicts another example of an impractical route generated by a prior art map application and including an example MP that is usable by an illustrative embodiment.

For example, consider FIG. 1D again. Suppose lines or polylines 186 define the GS around the railroad track in this map section. NMP 181 is situated in the polygon formed by section A of line 186, sides B and C formed by certain other features on the map, and edge D which is the edge of the depicted map section. If MP 187 were a point that could be used in the routing, an embodiment would cause NMP 181 to be linked to MP 187 in polygon bound by edges A, B, C, and D. Once NMP 181 is linked to MP 187, normal routing algorithms can then generate the remainder of the route to NMP 183, or at least to MP 182. This manner of selecting MP 187 for linking NMP 181 would avoid selecting MP 182, as the prior-art routing methods do, and thus avoid creating the impractical route comprising links 184 and 185.

Figure 1E:
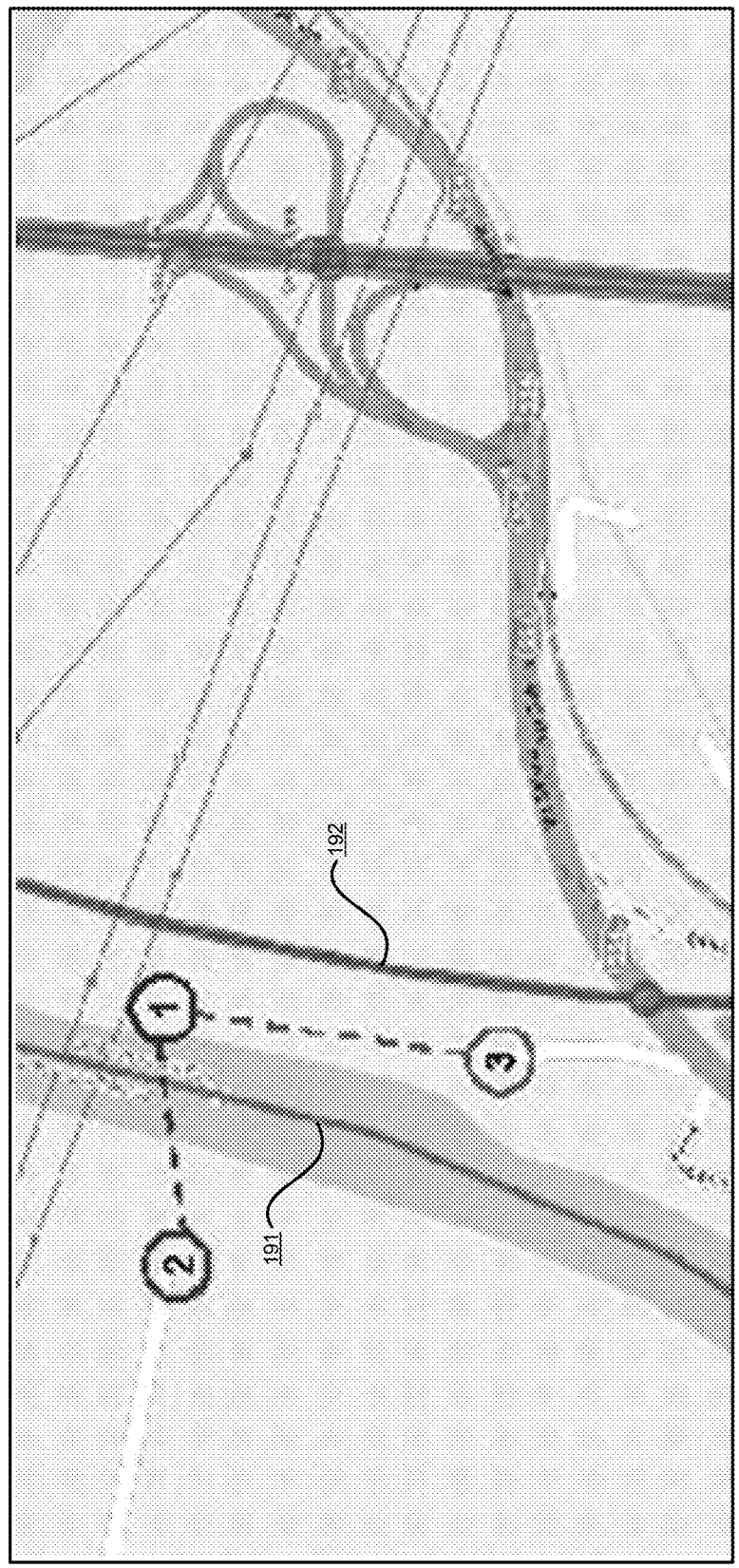
FIG. 1E depicts an example manner of selecting an MP for linking with an NMP in accordance with an illustrative embodiment.

Consider another example of FIG. 1E. FIG. 1E depicts an example manner of selecting an MP for linking with an NMP in accordance with an illustrative embodiment. Curve or polyline 191 is a GS that marks a river NCE. GS 192 marks another NCE, e.g., a road or a fence that cannot be crossed. The area between GSs 191 and 192 forms a polygon in the manner described above with respect to FIG. 1D. NMP (1) is located in the polygon. MP (2) and (3) are two MPs to which NMP (1) can be linked. Operating in a manner described herein, an embodiment selects MP (3) to link with NMP (1) because NMP (1) and MP (3) are both within the polygon. The embodiment does not select MP (2) for linking with NMP (1) because MP (2) is outside the polygon bound by GSs 191 and 192.

In some cases, multiple MPs may be collocated within a polygon or the same side of a polyline as an NMP. In such cases, each such MP is a candidate MP (CMP) for linking with the NMP. To select one MP from a set of CMPs, one embodiment computes the distance of each CMP from the NMP and arranges the CMPs in an ascending order of their distances from the NMP. The embodiment then selects that CMP as the MP which located is at the shortest distance from the NMP.

Another embodiment can select a CMP from the set of CMPs based on other factors as well. For example, one CMP may have a straighter path to the NMP as compared to another CMP. Accordingly, one embodiment may select that CMP to which the path from the NMP is the straightest in a given set of CMPs. Another embodiment may select that CMP which is closes to a landmark in or outside the polygon, and link the selected CMP with the NMP regardless of the selected CMP's relative distance or straightness from the NMP as compared to other CMPs.

These example manners of selecting a CMP from a set of CMPs are not intended to be limiting. From this disclosure, those of ordinary skill in the art will be able to conceive many other ways of selecting a CMP to link to an NMP and the same are contemplated within the scope of the illustrative embodiments.

It is also possible to operate an embodiment such that a search for a CMP within a polygon where the NMP is located stops as soon as the first qualifying CMP is found. For example, if several MPs are located in the polygon where the NMP is located, an embodiment can stop searching for CMPs as soon as the first CMP within the polygon is found, regardless of the CMPs' distance from the NMP, straightness of the path between the NMP and the found CMP, or any other criteria for selecting an MP to link with the NMP. In other words, the only qualifying condition for an MP to be a CMP is that the NMP and MP should not require crossing a GS of an NCE.

A method of an embodiment described herein, when implemented to execute on a device or data processing system, comprises substantial advancement of the functionality of that device or data processing system in creating a geographical constraints-aware map routing. For example, a prior-art method of routing using a map application, while linking an NMP to an MP, will route through an area of the map that cannot be crossed by the user in the actual geographical space. An embodiment identifies such NCE, defines one or more GSs corresponding to the NCE, identifies a polygon around the NMP where the polygon is bound by the one or more GSs, and selects an MP that lies within the polygon to link with the NMP. Such a manner of geographical constraints-aware map routing is unavailable in the presently used routing systems. Thus, a substantial advancement of such devices or data processing systems by executing a method of an embodiment is in avoiding unusable or impractical routes for the users and in creating routs that account for actual on-the-ground constraints faced by the user in navigating to or from an NMP.

The illustrative embodiments are described with respect to maps, map data, routes, points, elements, shapes, computations, selection criteria, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2A:
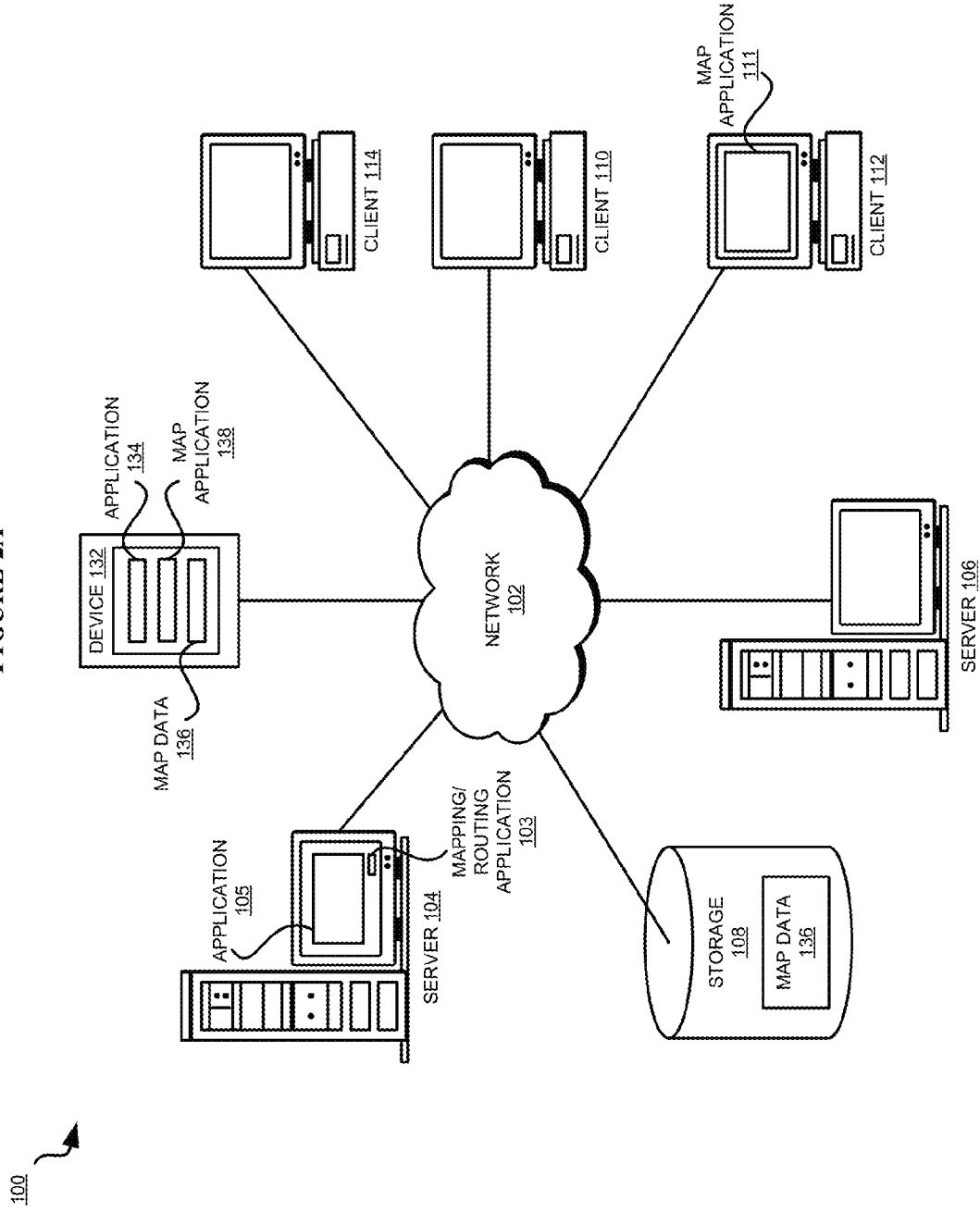
FIG. 2A depicts a block diagram of a network of data processing systems in which illustrative embodiments may be implemented.
Figure 2B:
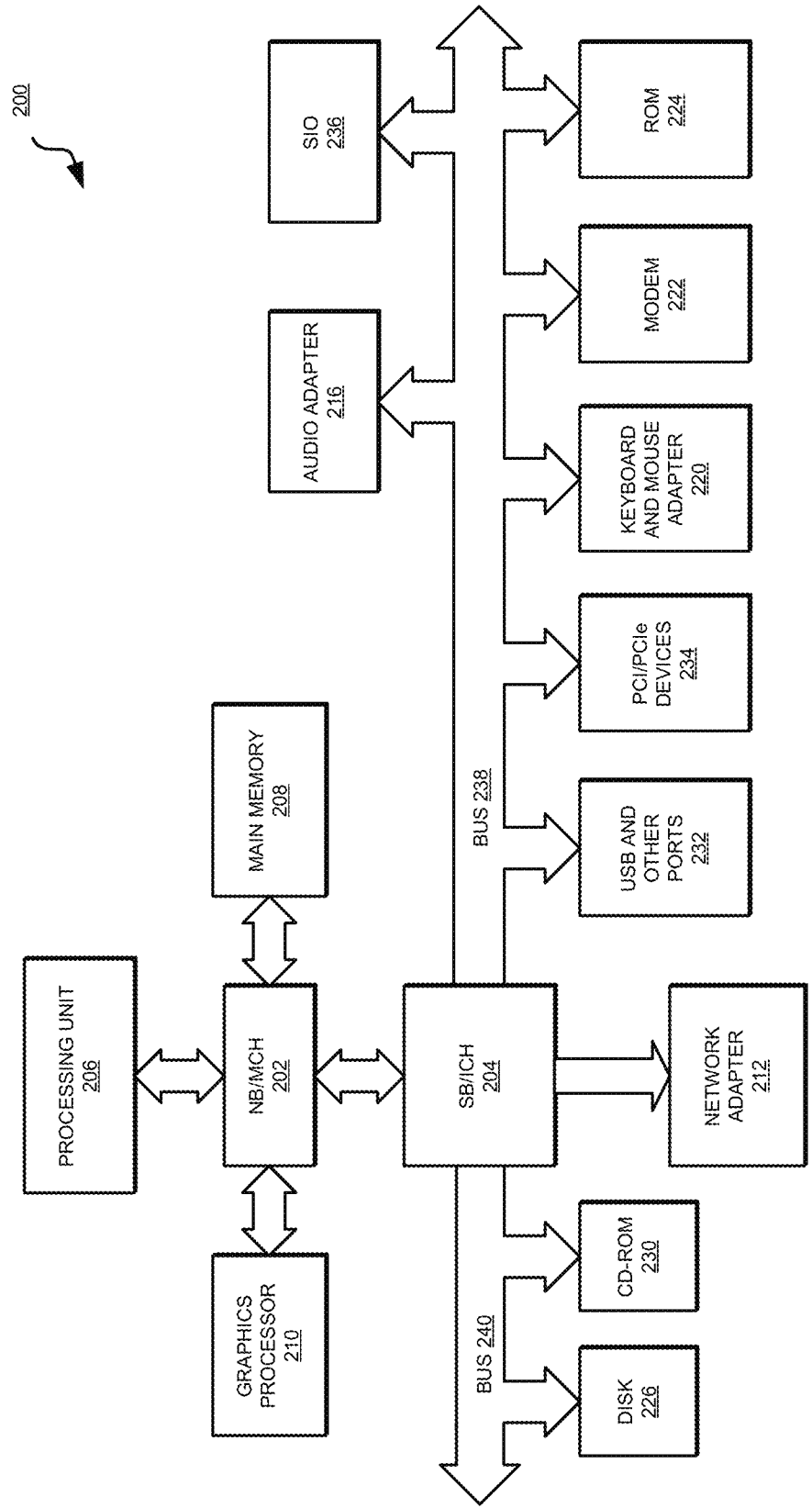
FIG. 2B depicts a block diagram of a data processing system in which illustrative embodiments may be implemented.

With reference to the figures and in particular with reference to FIGS. 2A and 2B, these figures are example diagrams of data processing environments in which illustrative embodiments may be implemented. FIGS. 2A and 2B are only examples and are not intended to assert or imply any limitation with regard to the environments in which different embodiments may be implemented. A particular implementation may make many modifications to the depicted environments based on the following description.

FIG. 2A depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 2A depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 2A can be configured to execute in device 132 in a similar manner. Any data or information stored or produced in another data processing system in FIG. 2A can be configured to be stored or produced in device 132 in a similar manner.

Application 134 executes in device 132 and implements an embodiment described herein. For example, some map data 136 may reside on device 132. Device 132 may include map application 138, which may compute a route on device 132 using map data 136. In some cases, such a resident map application on device 132 may also use map data 109 received over a network 102. Application 134 may be implemented as a modification to prior-art map application 138, or as an application operating in conjunction with prior-art map application 138. Application 105 executes in server 104 and implements an embodiment described herein. For example, prior-art map application 111 on client 110, such as in a webpage presented using a browser, may request a route computation from prior-art mapping or routing application 103, e.g., a map data source's website, hosted on server 104. Application 105 uses map data 109 to compute a geographical constraints-aware route in a manner described herein. Application 105 may be implemented as a modification to prior-art mapping or routing application 103, or as an application operating in conjunction with prior-art mapping or routing application 103.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2A is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2B, this figure depicts a block diagram of a data processing system in which illustrative embodiments may be implemented. Data processing system 200 is an example of a computer, such as servers 104 and 106, or clients 110, 112, and 114 in FIG. 2A, or another type of device in which computer usable program code or instructions implementing the processes may be located for the illustrative embodiments.

Data processing system 200 is also representative of a data processing system or a configuration therein, such as data processing system 132 in FIG. 2A in which computer usable program code or instructions implementing the processes of the illustrative embodiments may be located. Data processing system 200 is described as a computer only as an example, without being limited thereto. Implementations in the form of other devices, such as device 132 in FIG. 2A, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2B. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105 and 134 in FIG. 2A, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 2A-B may vary depending on the implementation. Other internal hardware or peripheral devices, such as flash memory, equivalent non-volatile memory, or optical disk drives and the like, may be used in addition to or in place of the hardware depicted in FIGS. 2A-B. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 2A-B and above-described examples are not meant to imply architectural limitations. For example, data processing system 200 also may be a tablet computer, laptop computer, or telephone device in addition to taking the form of a mobile or wearable device.

Figure 3:
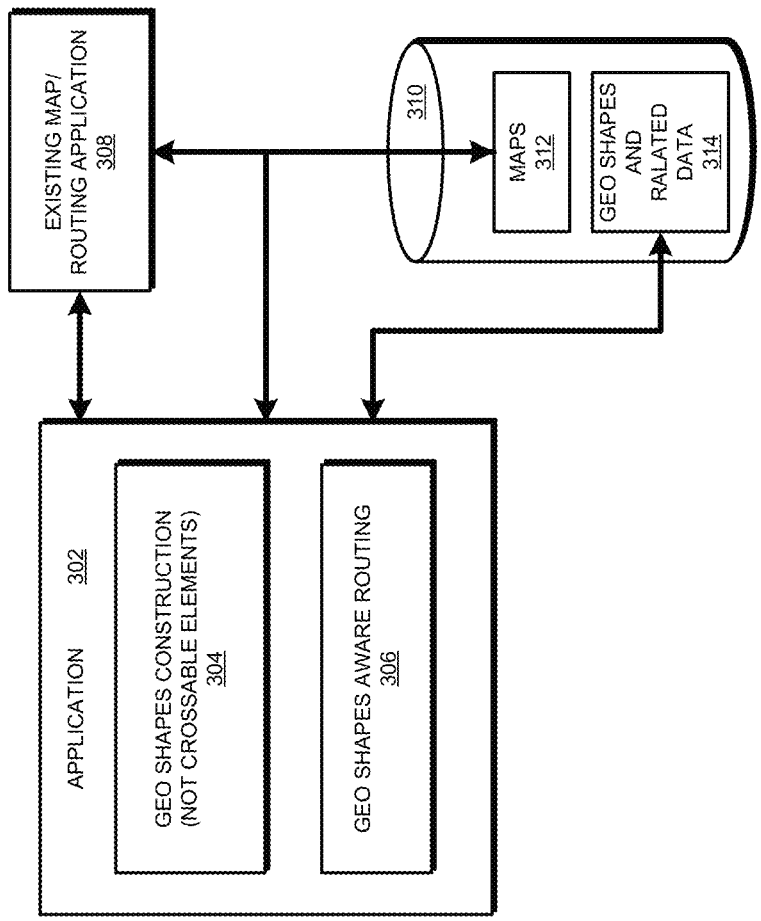
FIG. 3 depicts a block diagram of an example configuration for geographical constraints-aware map routing in accordance with an illustrative embodiment.

With reference to FIG. 3, this figure depicts a block diagram of an example configuration for geographical constraints-aware map routing in accordance with an illustrative embodiment. Application 302 is an example of application 134 or application 105 in FIG. 2A.

Component 304 recognizes an NCE and constructs a GS to define, bound, outline, enclose, or otherwise mark the NCE. Component 306 performs GS-aware routing as described herein.

Application 302 operates in or in conjunction with existing map application 308. Repository 310 may include one or more repositories. For example, maps 312 comprise map data that may be stored in one or more such repositories. Map application 308, application 302, or both use map data 312.

Component 304 produces GSs and related data 314. Component 306 uses GSs and related data 314.

Figure 4A:
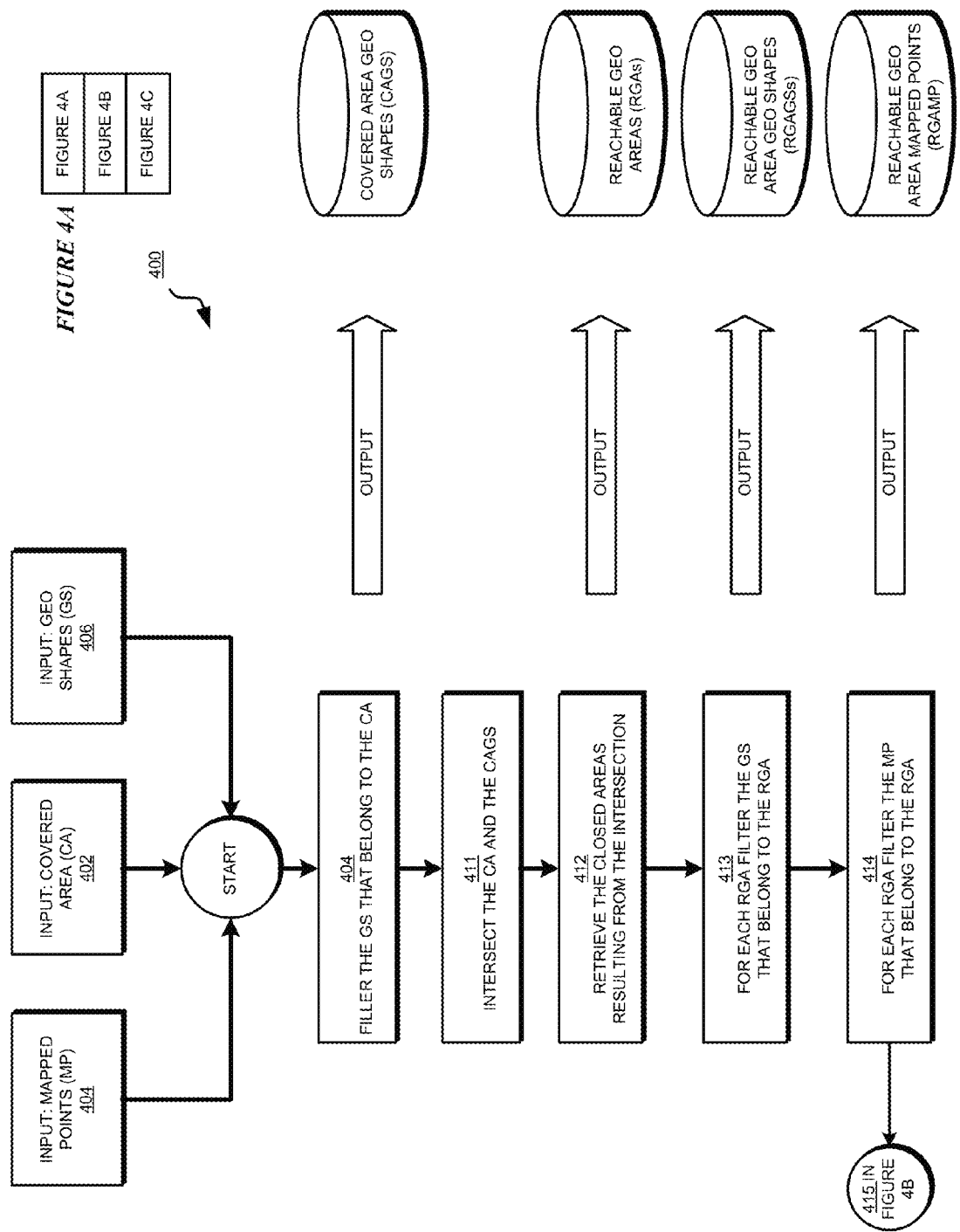
FIG. 4A depicts one portion of a process for geographical constraints-aware map routing in accordance with an illustrative embodiment.
Figure 4B:
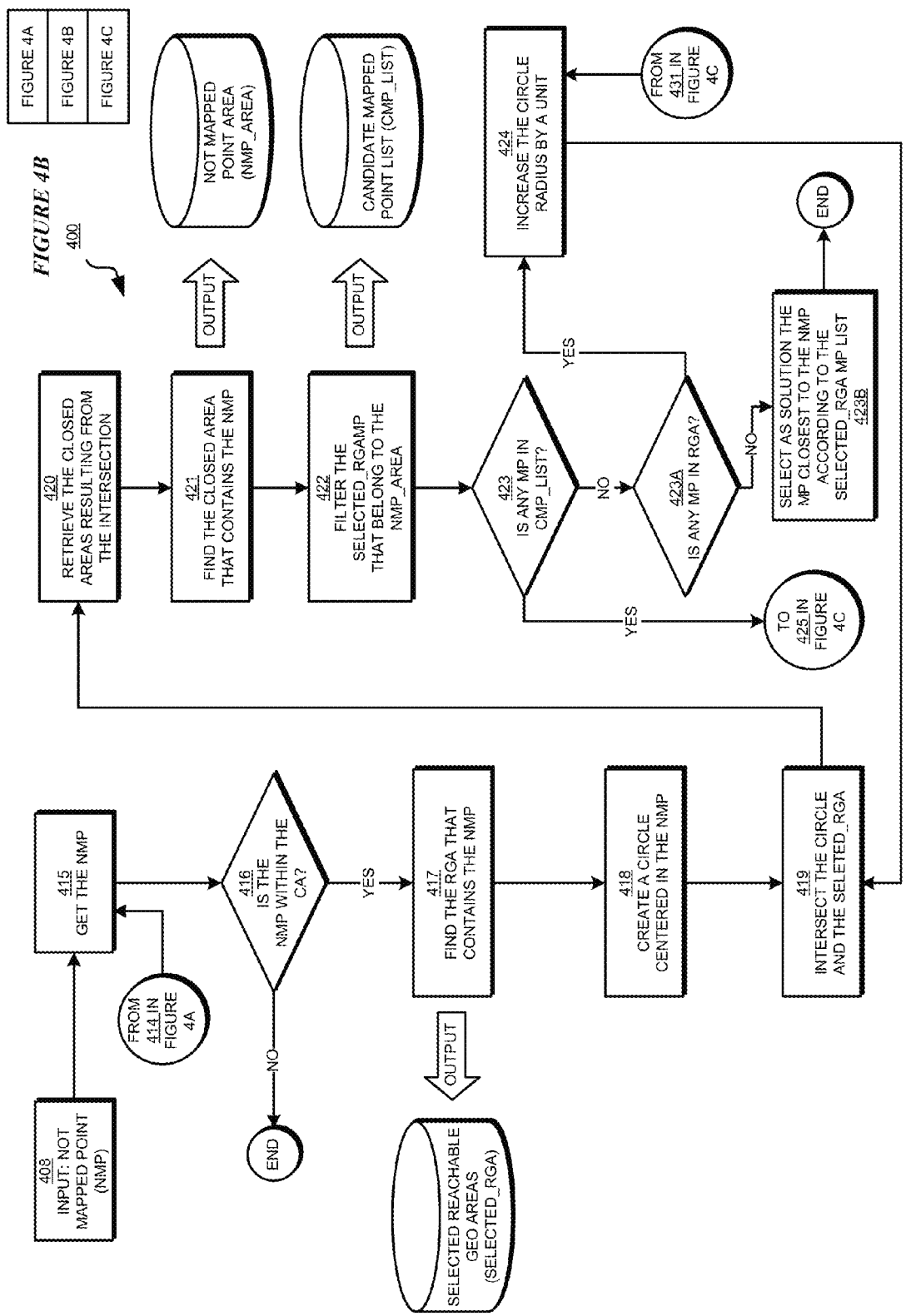
FIG. 4B depicts another portion of the process for geographical constraints-aware map routing in accordance with an illustrative embodiment.

FIGS. 4A, 4B, and 4C are three parts of a single flowchart, divided as shown for clarity. With reference to FIG. 4A, this figure depicts one portion of a process for geographical constraints-aware map routing in accordance with an illustrative embodiment. With reference to FIG. 4B, this figure depicts another portion of the process for geographical constraints-aware map routing in accordance with an illustrative embodiment. With reference to FIG. 4C, this figure depicts another portion of the process for geographical constraints-aware map routing in accordance with an illustrative embodiment. Process 400 can be implemented in application 302 in FIG. 3.

The application receives as input a covered area (CA) (block 402). A CA is an area covered by a map or a map section, or a portion thereof. For example, different zoom levels of a map will cover different areas of a mapped region, and will therefore result in CAs of different sizes.

The CA is not limited to a manner in which a map section is displayed on a particular device. In other words, a CA need not be rectangular in shape, but may be of any suitable shape selected from a given map. As a non-limiting example, if a map displays in a rectangular window and includes the map of an entire city within the rectangular window, the CA could be just the irregular area occupied by the map of the city or a portion thereof.

A set of MPs that is usable in that CA for routing by a routing algorithm form another input to the application (block 404). For example, the CA may include certain routing elements and points thereon already defined by the map data. Such points form the set of MPs in input 404. In one embodiment, the set of MPs in input 404 may include MPs that belong on the map, of which the CA is a part, but all MPs of the set need not be within the CA.

As described elsewhere in this disclosure, an embodiment can pre-process a map, or consequently all CAs within the map, to identify the NCEs and their corresponding GSs. The set of GSs that apply to the CA of input 402 forms another input to the application (block 406). In one embodiment, the set of GSs in input 406 may include GSs that apply to the map, of which the CA is a part, but all GSs of the set need not be within the CA.

Figure 5:
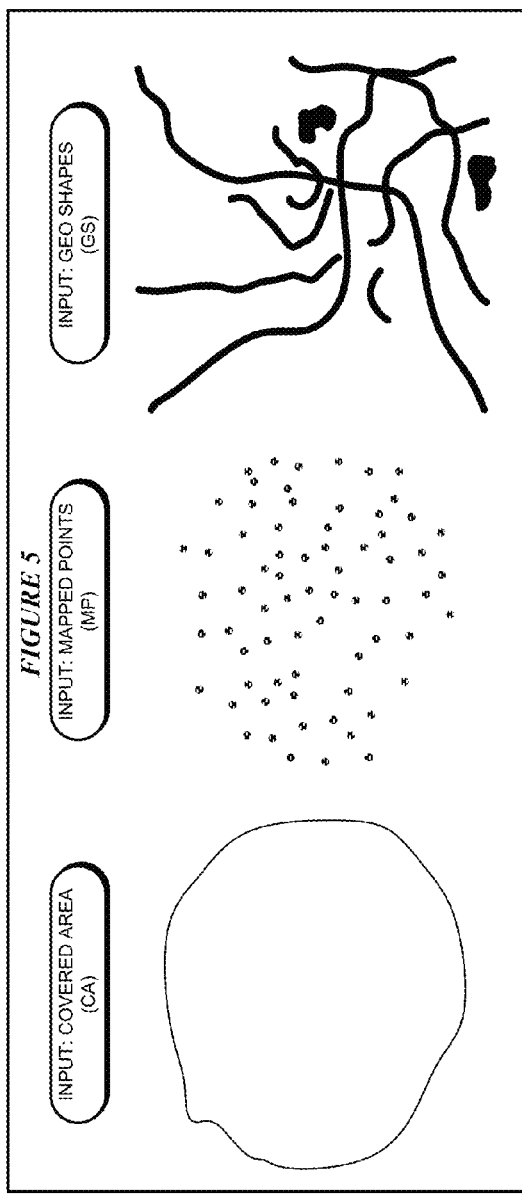
FIG. 5 depicts an example CA of an input, an example set of MPs, and an example set of GSs in accordance with an illustrative embodiment.
Figure 6:
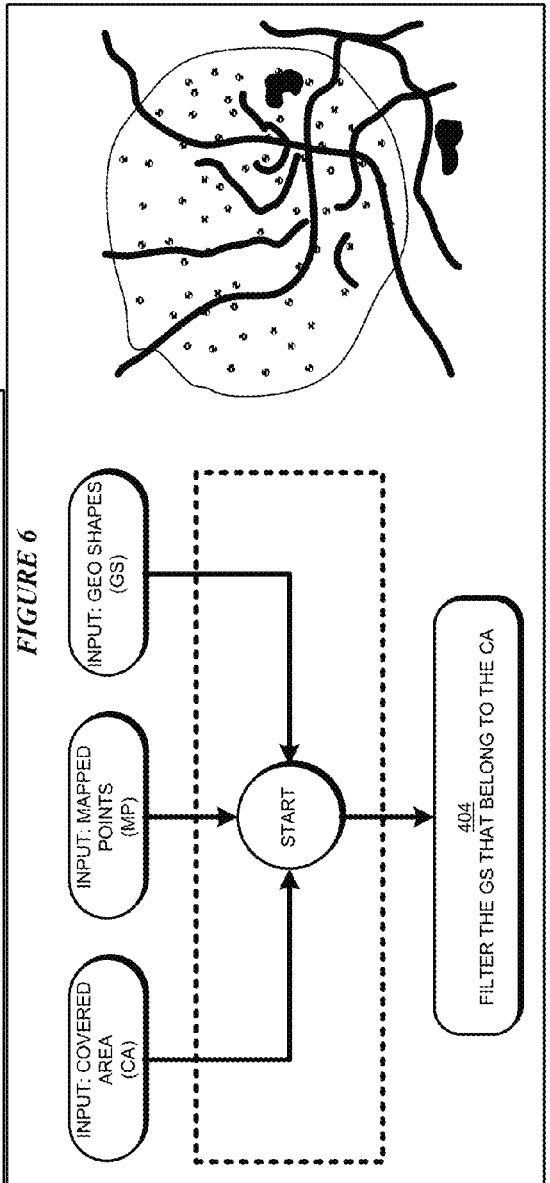
FIG. 6 depicts how the example CA, the example set of MPs, and the example set of GSs combine together in accordance with an illustrative embodiment.

FIG. 5 depicts an example CA of input 402, an example set of MPs 404, and an example set of GSs 406. FIG. 6 depicts how the example CA, the example set of MPs, and the example set of GSs combine together at the beginning of process 404.

Returning to Process 400, when input 406 includes GSs inside and outside of the CA, the application, the application filters or selects that subset of GSs that belong in the CA (block 410). The application optionally saves the subset of the covered area geo shapes (CAGS) in a repository, such as in repository 310 as a part of data 314 in FIG. 3. The application intersects, overlays, or otherwise associates the selected subset of GSs with the CA (block 411).

FIG. 7 depicts the selected subset of GSs overlaid on the CA. Notice that the GSs that were extending out of the CA in FIG. 6 are not selected, and therefore not overlaid or shown in FIG. 7.

Next in Process 400, the application retrieves the closed areas, or polygons, resulting from the intersection operation of block 411 (block 412). These closed areas or polygons are also called "reachable geo areas" (RGAs). The application optionally saves the RGAs in a repository, such as in repository 310 as a part of data 314 in FIG. 3.

FIG. 8 depicts the closed areas or polygons formed in this manner. For example, reachable area or polygon 802 is bound by boundaries 804, 806, 808, and 810 as shown.

Boundaries 804, 806, 808, and 810 may be formed by a GS, a routing element, a map edge, or some combination thereof.

Further in Process 400, for each RGA identified in this manner, the application filters or selects those CAGSs that are applicable to the RGA (block 413). The application optionally saves the CAGSs that are applicable to the RGA as reachable geo area geo shapes (RGA GS) in a repository, such as in repository 310 as a part of data 314 in FIG. 3. FIG. 9 depicts the CAGSs applicable to several RGA, including RGA 802. For example, CAGS 912 and CAGS 914 are applicable to RGA 802.

Continuing in Process 400, for each RGA, the application filters or selects those MPs that belong to the RGA (block 414). The application optionally saves the MPs that belong to the RGA as reachable geo area mapped points (RGAMPs) in a repository, such as in repository 310 as a part of data 314 in FIG. 3. FIG. 10 depicts the MPs applicable to several RGA, including RGA 802. For example, MPs 1012 and 1014 are some examples of MPs applicable to RGA 802.

In process 400, a user or an existing map application provides an NMP as an input (block 408). The application receives the NMP input (block 415). The application determines whether the NMP lies within the CA (block 416).

As an example, FIG. 11 depicts NMP 1112 that is received as the input. NMP 1112 is within the depicted CA, and is shown to lie particularly within RGA 802 as an example to illustrate an operation of an embodiment.

In process 400, if the input NMP is not within the CA ("No" path of block 416), the routing to or from that NMP cannot be performed using the CA, and the application ends process 400 thereafter. If the input NMP is within the CA ("Yes" path of block 416), the application finds the RGA that contains the NMP (block 417). The application optionally saves the selected one or more RGA (SELECTED_RGA) in a repository, such as in repository 310 as a part of data 314 in FIG. 3.

Returning to Process 400, as one non-limiting manner of finding MPs proximate to the input NMP, the application creates a circle of a certain radius and centered at the NMP (block 418).

FIG. 12 depicts example circle 1212 centered at NMP 1112 in RGA 802. The radius of the circle can be specified by a user, set as a default, selected from a preference, chosen from a collection of radii depending upon a size of the RGA in which the NMP is located, or selected by other suitable method.

Other ways of finding MPs proximate to the NMP can include a directional arc in one direction within the RGA, more than one directional arcs of different radii directed in different directions within the RGA, and other manners of directional searching within the RGA. These and other manners of finding the MP that is within a certain distance from the NMP in the RGA are contemplated within the scope of the illustrative embodiments.

Back in Process 400, the application intersects the circle and the selected RGA (block 419). The application retrieves the one or more closed area resulting from the intersection (block 420). Note that under certain circumstances, the intersection may result in more than one closed areas at block 420. The application finds or selects that closed area which includes the NMP (block 421). The application optionally saves the closed area as NMP area (NMP_Area) in a repository, such as in repository 310 as a part of data 314 in FIG. 3.

FIG. 13 depicts example closed area 1312, which is a part of RGA 802 within circle 1212 centered at NMP 1112. In the depicted non-limiting example, area 1312 includes areas 1312A, 1312B, and 1312C. NMP 1112 lies in area 1312B with some MPs lying in areas 1312A and 1312C as examples.

Continuing in Process 400, the application filters or selects those RGA MPs that belong to the NMP area (block 422). The result of block 422 is a candidate MP list, which the application optionally saves as (CMP_List) in a repository, such as in repository 310 as a part of data 314 in FIG. 3.

FIG. 14 depicts an example scenario of the candidate MP list. As shown, according to the radius previously selected, it so turns out that no MPs are included in area 1312B and therefore the candidate MP list in this iteration is empty. In other words, within the distance of the selected radius from NMP 1112, no MPs are available in RGA 802.

In process 400, the application determines whether any MPs are listed in the CMP list produced at block 422 (block 423). If no MPs are listed in the CMP list ("No" path of block 423), the application determines whether there are any MPs in the RGA at all (block 423A). If there are no MPs in the RGA ("No" path of block 423A), the application selects, as the solution for linking the NMP, that MP from the list of selected RGA MPs which is closest to the NMP (block 423B). The application ends process 400 thereafter.

If there are MPs in the RGA ("Yes" path of block 423A), the application increases a distance of the search from the NMP, e.g., by increasing the previously selected radius (block 424). The application then returns to block 419 and proceeds therefrom in the manner described herein.

FIG. 15 depicts an example manner of changing a search distance for CMPs. Circle 1512 is of the radius selected in a previous iteration, and circle 1514 is of the new increased radius selected at block 424. Circle 1514 remains centered at NMP 1112 in area 1312B.

If by increasing the search distance in this or another similarly purposed manner, the application finds at least one CMP listed in the CMP list ("Yes" path of block 423), the application calculates a distance between each CMP and the NMP (block 425). The application sorts the CMP list in the order of the distances between the CMPs in the list and the NMP (block 426). The application selects the CMP that is at the shortest distance from the NMP (block 427).

FIG. 16 depicts the distance based selection of CMP. Notice that by increasing the radius in the shape of the closed area in which NMP 1112 lies has changed in this example depiction. Example GS 1602 no longer separates areas 1312B and 1312C as was the case in FIG. 13. Area 1604 connects areas 1606A and 1606B, making area 1606 the closed area now. Area 1606 includes NMP 1112 and CMP 1614. Assume that CMP 1614 is the closest CMP to NMP 1112 according to the operation of blocks 426 and 427 in process 400.

Returning to process 400, the application creates the shortest path from the NMP to the selected CMP (block 428). The application determines whether the path intersects any RGA GS (block 429).

FIG. 17 depicts the path between the NMP and the CMP. Path 1702 is a straight line path between NMP 1112 and CMP 1614. In the depicted example, path 1702 crosses RGA GS 1602 which is included in closed area 1606.

In process 400, when the path between the NMP and CMP intersects a GS ("Yes" path of block 429), the application removes the CMP from the CMP list (block 430). The application then determines whether the CMP list includes any more CMPs (block 431).

If the CMP list does not include any more CMPs ("No" path of block 430), the application returns to block 424 to increase the search distance. If the CMP list does include more CMPs ("Yes" path of block 430), the application returns to block 427 to select the CMP with the shortest distance remaining in the sorted CMP list.

At some iteration of increasing the search distance and analyzing the paths to the various CMPs as described herein, the application finds some CMP whose path does not intersect a GS in the closed area. FIG. 18 depicts a successful search for a CMP in an enlarged search area. Closed area 1802 is larger than closed area 1312 in FIG. 13 due to an increased search radius. The CMP list for area 1802 includes CMPs 1814 and 1816. Path 1818 is the shortest path to CMP 1814, and path 1820 is the shortest path to CMP 1816. Path 1820 intersects with GS 1602, therefore, CMP 1816 is eliminated. Path 1818 to CMP 1814 does not intersect any GS in closed area 1802. Assume only for the clarity of the illustration that even if there may be other CMPs in the CMP list, no other CMP is at a shorter distance from NMP 1112 with a path that does not intersect any GS in area 1802.

Accordingly, in process 400, the application selects the CMP as the starting point from where a prior art map application can being routing the remainder of the path to a destination (block 432). In other words, in FIG. 18, CMP 1814 is selected as the MP to which NMP 1112 is linked, and the prior-art map application begins the remainder of the routing from MP 1814. The application optionally saves the selected CMP of block 432 as the starting MP in a repository, such as in repository 310 as a part of data 314 in FIG. 3. The application ends process 400 thereafter.

With reference to FIG. 19, this figure depicts comparative routes to compare the geographical constraints-aware map routing with the prior-art routing. Route rendering 1902 is the same as the rendering depicted in FIG. 1D, where a prior-art map application has produced an impractical route across a railroad track.

In contrast, routing rendering 1952 is generated by using an embodiment described herein. According to an embodiment, the revised route takes the user to MP 1954, which then takes the user on a safer and more practical route without having to cross GS 186 of the railroad tracks. The revised route of rendering 1952 keeps the user on a road, which safely and legally passes over or under the tracks to get the user across to destination 183.

Thus, a computer implemented method, system or apparatus, and computer program product are provided in the illustrative embodiments for predicting location-based resource consumption in mobile devices. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for geographical constraints-aware map routing, the method comprising:
   marking, using a shape on a map, a not crossable element (NCE), wherein a data of the map does not prevent a route from crossing the NCE, and wherein the data of the map defines the set of mapping points (MP) such that the route has to be restricted to the set of MPs;
   selecting a closed area on the map, wherein the closed area comprises a polygon bound at least on one side by a portion of the shape;
   selecting a set of MPs that are included in the closed area, wherein a route is formed by connecting one MP to another MP;
   identifying, using a processor and a memory, a subset of MPs as a set of candidate MPs (CMP), wherein each CMP lies within a search distance of a not-mapping point (NMP), and wherein the NMP has to be included in the route;
   sorting the CMPs in the set of CMPs according to a distance of each CMP from the NMP;
   selecting, from the set of CMPs, a subset of CMPs whose paths to the NMP do not intersect with any shape corresponding to any NCE in the closed area; and
   linking with the NMP, in the route, a selected CMP from the subset of CMPs.

2. The method of claim 1, further comprising:
   computing, for a first CMP in the set of CMPs, a first distance of a first shortest part between the first CMP and the NMP;
   computing, for a second CMP in the set of CMPs, a second distance of a second shortest part between the second CMP and the NMP; and
   selecting, despite the second distance being shorter than the first distance, the first CMP in the subset of CMPs because the second shortest path intersects with the shape.

3. The method of claim 1, wherein the closed area includes a second shape corresponding to a second NCE on the map.

4. The method of claim 1, further comprising:
   using the link as a portion of the route; and
   computing a remainder of the route from the selected CMP to a second point on the map.

5. The method of claim 1, wherein the NMP is at one end of the route.

6. The method of claim 1, further comprising:
   setting a radius as a first search distance;
   determining whether any MPs are included in a circle centered at the NMP where the circle has the radius;
   increasing, responsive to no MPs being included in the circle, the radius to a second search distance; and
   determining, as a part of identifying the set of CMPs, that the subset of MPs is included in the circle centered at the NMP with the increased radius of the second search distance.

7. The method of claim 1, further comprising:
   intersecting the shape with the map to form a set of closed areas, the set of closed areas including the closed area, wherein the shape represents a location of the NCE, and wherein the shape comprises at least one of (i) a line segment and (ii) a polygon.

8. The method of claim 1, wherein the shape encloses the NCE using an edge of the map and a line segment.

9. The method of claim 1, further comprising:
   recognizing a characteristic of a feature in a three dimensional (3D) geographical space, wherein the NCE represents the feature, and wherein the characteristic prevents a mode of transportation to cross the feature in the 3D geographical space.

10. The method of claim 1, wherein the method is embodied in a computer program product comprising one or more computer-readable storage devices and computer-readable program instructions which are stored on the one or more computer-readable tangible storage devices and executed by one or more processors.

11. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

12. A computer program product for geographical constraints-aware map routing, the computer program product comprising one or more computer-readable storage devices, and program instructions stored on at least one of the one or more storage devices, the stored program instructions comprising:

program instructions to mark, using a shape on a map, a not crossable element (NCE), wherein a data of the map does not prevent a route from crossing the NCE, and wherein the data of the map defines the set of mapping points (MP) such that the route has to be restricted to the set of MPs;

program instructions to select a closed area on the map, wherein the closed area comprises a polygon bound at least on one side by a portion of the shape;

program instructions to select a set of MPs that are included in the closed area, wherein a route is formed by connecting one MP to another MP;

program instructions to identify, using a processor and a memory, a subset of MPs as a set of candidate MPs (CMP), wherein each CMP lies within a search distance of a not-mapping point (NMP), and wherein the NMP has to be included in the route;

program instructions to sort the CMPs in the set of CMPs according to a distance of each CMP from the NMP;

program instructions to select, from the set of CMPs, a subset of CMPs whose paths to the NMP do not intersect with any shape corresponding to any NCE in the closed area; and program instructions to link with the NMP, in the route, a selected CMP from the subset of CMPs.

13. The computer program product of claim 12, further comprising:

program instructions to compute, for a first CMP in the set of CMPs, a first distance of a first shortest part between the first CMP and the NMP;

program instructions to compute, for a second CMP in the set of CMPs, a second distance of a second shortest part between the second CMP and the NMP; and program instructions to select, despite the second distance being shorter than the first distance, the first CMP in the subset of CMPs because the second shortest path intersects with the shape.

14. The computer program product of claim 12, wherein the closed area includes a second shape corresponding to a second NCE on the map.

15. The computer program product of claim 12, further comprising:

program instructions to use the link as a portion of the route; and program instructions to compute a remainder of the route from the selected CMP to a second point on the map.

16. The computer program product of claim 12, wherein the NMP is at one end of the route.

17. The computer program product of claim 12, further comprising:

program instructions to set a radius as a first search distance;

program instructions to determine whether any MPs are included in a circle centered at the NMP where the circle has the radius;

program instructions to increase, responsive to no MPs being included in the circle, the radius to a second search distance; and program instructions to determine, as a part of identifying the set of CMPs, that the subset of MPs is included in the circle centered at the NMP with the increased radius of the second search distance.

18. The computer program product of claim 12, wherein the data of the map defines the set of MPs such that the route has to be restricted to the set of MPs.

19. A computer system for geographical constraints-aware map routing, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to mark, using a shape on a map, a not crossable element (NCE), wherein a data of the map does not prevent a route from crossing the NCE, and wherein the data of the map defines the set of mapping points (MP) such that the route has to be restricted to the set of MPs;

program instructions to select a closed area on the map, wherein the closed area comprises a polygon bound at least on one side by a portion of the shape;

program instructions to select a set of MPs that are included in the closed area, wherein a route is formed by connecting one MP to another MP;

program instructions to identify, using a processor and a memory, a subset of MPs as a set of candidate MPs (CMP), wherein each CMP lies within a search distance of a not-mapping point (NMP), and wherein the NMP has to be included in the route;

program instructions to sort the CMPs in the set of CMPs according to a distance of each CMP from the NMP;

program instructions to select, from the set of CMPs, a subset of CMPs whose paths to the NMP do not intersect with any shape corresponding to any NCE in the closed area; and program instructions to link with the NMP, in the route, a selected CMP from the subset of CMPs.

\* \* \* \* \*